(12) United States Patent
Curington

(10) Patent No.: US 9,691,006 B2
(45) Date of Patent: Jun. 27, 2017

(54) POINT CLOUD SIMPLIFICATION

(71) Applicant: VISUAL TECHNOLOGY SERVICES LIMITED, Berkshire (GB)

(72) Inventor: Ian Curington, Berkshire (GB)

(73) Assignee: VISUAL TECHNOLOGY SERVICES LIMITED, Berkshire (GB)

( * ) Notice: Subject to any disclaimer, the term of this patent is extended or adjusted under 35 U.S.C. 154(b) by 124 days.

(21) Appl. No.: 14/689,904

(22) Filed: Apr. 17, 2015

(65) Prior Publication Data
US 2015/0220812 A1    Aug. 6, 2015

Related U.S. Application Data

(63) Continuation-in-part of application No. 14/577,625, filed on Dec. 19, 2014.

(30) Foreign Application Priority Data

Dec. 20, 2013   (GB) .................................. 1322711.1

(51) Int. Cl.
| G06K 9/00 | (2006.01) |
| G06K 9/62 | (2006.01) |
| G06K 9/46 | (2006.01) |

(52) U.S. Cl.
CPC ....... G06K 9/6219 (2013.01); G06K 9/00201 (2013.01); G06K 9/469 (2013.01)

(58) Field of Classification Search
None
See application file for complete search history.

(56) References Cited

U.S. PATENT DOCUMENTS

| 2010/0119120 A1* | 5/2010 | Bronstein ............ G06K 9/6215 382/113 |
| 2010/0189320 A1* | 7/2010 | Dewaele ............... G06T 7/0081 382/128 |

(Continued)

FOREIGN PATENT DOCUMENTS

WO    2013/123636 A1    8/2013

OTHER PUBLICATIONS

Sep. 12, 2014 Search Report issued in GB1322711.1.
(Continued)

*Primary Examiner* — Vikkram Bali
(74) *Attorney, Agent, or Firm* — Kenealy Vaidya LLP

(57) ABSTRACT

Some embodiments are directed to a method of cloud point simplification that includes implementing recursive spatial partitioning of the set of points into a hierarchy of clusters and, for each cluster, calculating a tangent plane estimate for the points in the cluster and deriving a confidence factor for the calculated tangent plane estimate. The method further includes identifying representative points within each cluster in the hierarchy and, for each representative point, defining a point-pair that consists of the representative point and a representative point of an immediate parent cluster; calculating a contraction error metric for each point-pair that is weighted by the inverse of the confidence factors calculated for the clusters associated with each representative point; and iteratively contracting the point-pair with the lowest contraction error metric, updating remaining point-pairs as a result of the contraction, and revising the contraction error metric of the updated point-pairs accordingly.

19 Claims, 12 Drawing Sheets

(56) References Cited

U.S. PATENT DOCUMENTS

| | | | | |
|---|---|---|---|---|
| 2013/0060775 A1* | 3/2013 | Qiu | ............ | G06F 19/24 |
| | | | | 707/737 |
| 2013/0335406 A1* | 12/2013 | Tabellion | .............. | G06T 17/005 |
| | | | | 345/419 |
| 2014/0089834 A1* | 3/2014 | Marder-Eppstein | .. | G06F 3/0484 |
| | | | | 715/771 |
| 2014/0160123 A1* | 6/2014 | Yang | ....................... | G06T 17/00 |
| | | | | 345/420 |

OTHER PUBLICATIONS

Hoppe et al, "Surface Reconstruction from Unorganized Points" Siggraph 1992 proceedings.

Zhou et al., "Reconstructing Surface Discontinuities by Intersecting Tangent planes of Advancing Mesh Frontiers" Advances in Modelling, Animation and Rendering, 2002, pp. 183-199.

B.Bertoni, "Multi-dimensional Ellipsoidal Fitting" Department of Physics, South Methodist University, Tech. Rep. SMU-HEP-10-14, Aug. 20, 2010.

M.Garland et al., "Surface Simplification Using Quadric Error Metrics" 1997.

M.Garland et al, "Simplifying Surfaces with Color and Texture using Quadric Error Metrics" 1998.

* cited by examiner

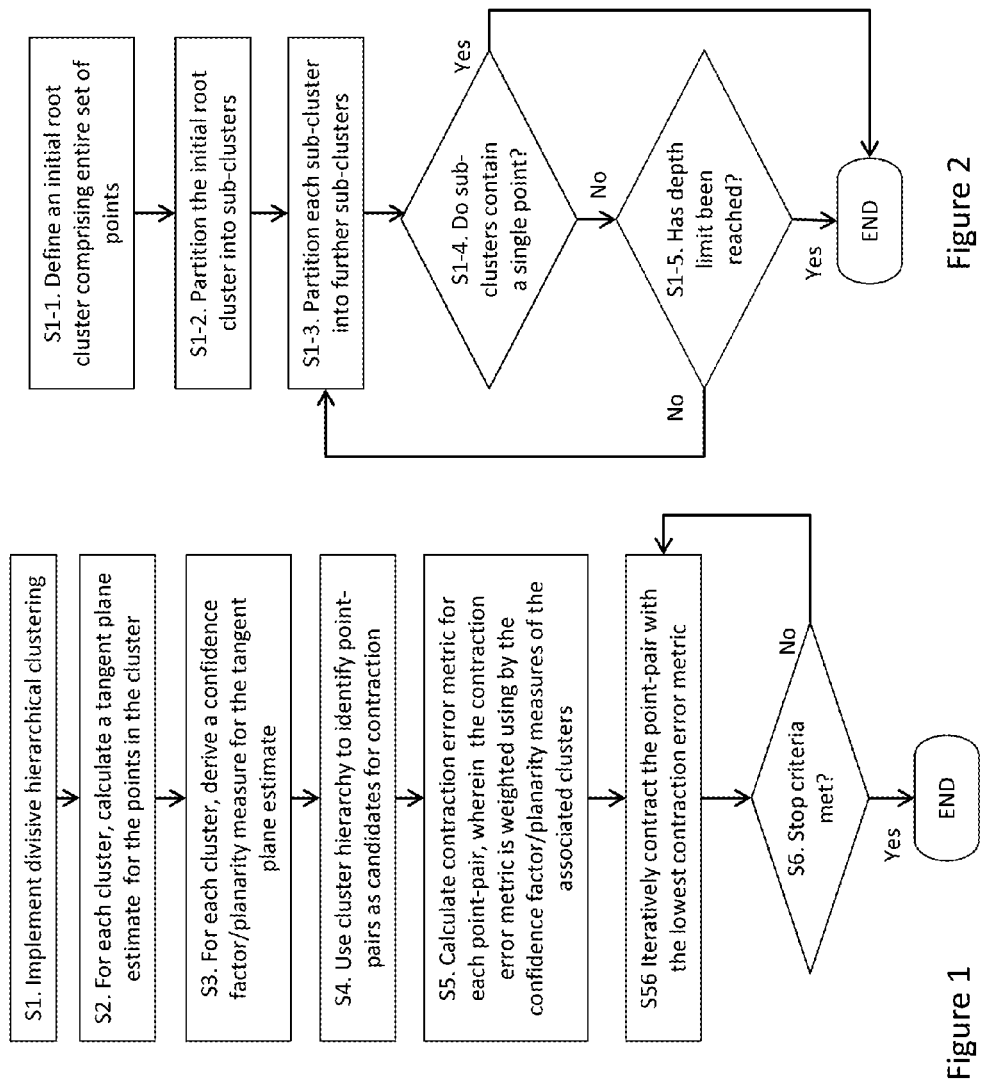

$RP_n$ = representative point(s) of cluster $C_n$

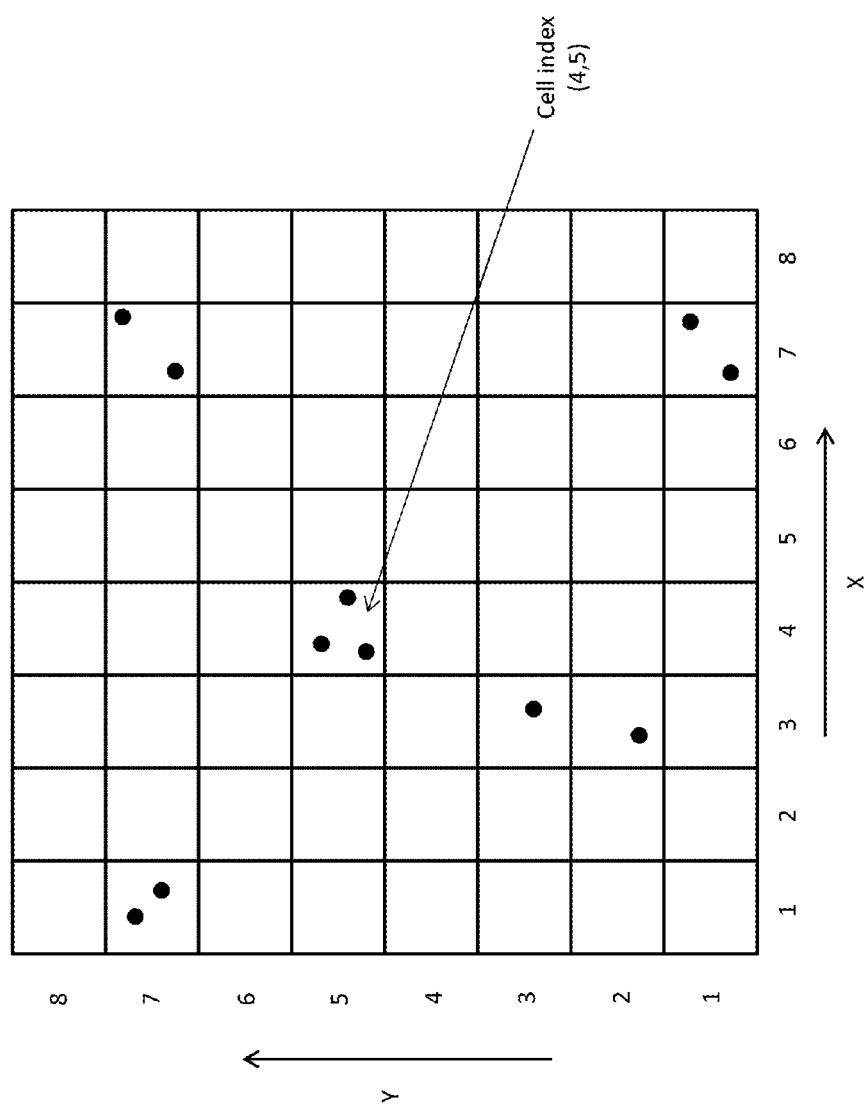

POINT CLOUD SIMPLIFICATION

This application is a continuation in part of U.S. patent application Ser. No. 14/577,625 filed Dec. 19, 2014, which claims the priority benefit under 35 U.S.C. §119 of British Patent Application No. 1322711.1, filed on Dec. 20, 2013, all of which are hereby incorporated in their entireties by reference.

The present invention relates to methods and apparatus for simplification of a point cloud, wherein a point cloud comprises a plurality of data points each of which is defined by a set of coordinates.

In recent years the use of LiDAR and laser scanning devices has become much more common, and the volume of data acquired by these devices has dramatically increased. In this regard, these scanning devices typically produce point cloud data that represents the three-dimensional (3D) surfaces and/or objects that have been scanned. A point cloud typically comprises a massive data set that defines a large number of data points in some coordinate system. For example, a laser scan of a physical object will typically produce a data set that contains millions of data points, each specified by a 3-tuple using orthogonal coordinates that represent 3D space (e.g. x, y, z).

The processing, analysis and reporting of such large point cloud data sets can be difficult. In particular, it is often the case that the size of a point cloud data set exceeds the design and performance capabilities of the systems that need to make use of this data. Consequently, methods for reducing the size of point cloud data sets are an important pre-processing step in order to reduce the volume of data to a level suitable for consuming systems. The simplified/reduced point cloud data can then be more efficiently processed. In particular, simplifying point cloud data reduces the bandwidth required to transmit the point cloud data set across a network, reduces the amount of memory/storage space required to store the data set, and reduces the time required to process the data set (e.g. when being used in some form of practical application).

There are a number of conventional approaches for simplifying point cloud data. However, these conventional approaches either carry a significant risk of losing key features of the objects and/or surfaces represented by the data (e.g. sub-sampling decimation, uniform spatial clustering) or are complex to implement and therefore incur significantly more computational expense, requiring greater processing power/time (e.g. k-neighbours plane reconstruction).

The present invention provides a method of point cloud simplification (i.e. reducing the number of data points in a point cloud) that provides improved sample selection, thereby preserving key features and minimizing distortions, whilst also being computationally efficient. In particular, the present invention provides a method of point cloud simplification that preferentially preserves points in areas of high curvature (e.g. edges) over points in flat areas.

Therefore, according to a first aspect there is provided a computer implemented method for simplification of a point cloud that represents one or more three-dimensional surfaces or objects, the point cloud comprising a set of points. The method comprises implementing recursive spatial partitioning of the set of points into a hierarchy of clusters and, for each cluster, calculating a tangent plane estimate for the points in the cluster and deriving a confidence factor for the calculated tangent plane estimate, wherein the confidence factor is a measure of the planarity of the points in the cluster. The method further comprises identifying representative points within each cluster in the hierarchy and, for each representative point, defining a point-pair that consists of the representative point and a representative point of an immediate parent cluster; calculating a contraction error metric for each point-pair that is weighted by the inverse of the confidence factors calculated for the clusters associated with each representative point; and iteratively contracting the point-pair with the lowest contraction error metric, updating remaining point-pairs as a result of the contraction, and revising the contraction error metric of the updated point-pairs accordingly.

The confidence factor is preferably a non-dimensional scalar measure of the planarity of the points in a cluster. The value of the confidence factor is low (e.g. towards 0.0) if the points in a cluster are randomly distributed throughout a three-dimensional bounding box of the cluster, and the value of the confidence factor is high (e.g. 1.0) if all of the points in a cluster lie on or near a planar surface.

The step of deriving a confidence factor for the calculated tangent plane estimate may comprises deriving an ellipsoid that fits all of the points in the cluster, including determining eigenvectors for three principle axes of the ellipsoid, and calculating the difference between a longest eigenvector of the ellipsoid and a shortest eigenvector of the ellipsoid as a measure of the planarity of the points in a cluster.

The step of deriving a confidence factor for the calculated tangent plane estimate may alternatively comprise deriving an average of the squared distances between each of the points in the cluster and the calculated tangent plane estimate.

The tangent plane estimate for a cluster may be determined by finding a plane that minimizes the squared distances from the plane to all points in the cluster.

The method may further comprise, when calculating a contraction error metric for each point-pair, taking into account both the confidence factor derived for the calculated tangent planes for the clusters associated with each representative point and the calculated tangent planes.

The representative point for a cluster may be any of a point selected from the points in the cluster, a centroid derived for the points in the cluster, and a centroid of a bounding box derived for the points in the cluster The recursive spatial partitioning of the set of points into a hierarchy of clusters may comprise implementing divisive hierarchical clustering of the set of points. The recursive spatial partitioning of the set of points into a hierarchy of clusters may comprise partitioning an initial root cluster comprising the set of points into a number of clusters, and recursively partitioning each cluster into further clusters until either each cluster contains a single point or a predefined depth is reached.

The step of identifying representative points within each cluster in the hierarchy can comprises, for a branch cluster, identifying the point that is closest to the mean of the points within the cluster as a representative point, and, for a leaf cluster, identifying each point within the cluster as a representative point.

The method may further comprise generating a logical tree by defining the representative points as nodes of the logical tree, and, for each representative point, defining an edge of the logical tree as a point-pair that consists of the representative point and a representative point of an immediate parent cluster.

The step of updating remaining point-pairs as a result of the contraction may comprise updating the logical tree as a result of the contraction of the point-pair.

The method may further comprise defining a contraction queue in which the point-pair with the lowest contraction error metric is first in the contraction queue; and after each contraction, updating the contraction queue to reflect updates in the calculated contraction error metrics of the updated point-pairs.

The step of updating remaining point-pairs as a result of the contraction may comprise identifying other point-pairs that include either of the points that were included in the contracted point-pair, and updating the identified point-pairs to include a new point generated as a result of the contraction. The step of revising the contraction error metric of the updated point-pairs accordingly may then comprise, for each of the point-pairs that are updated to include a new point generated as a result of the contraction, recalculating the contraction error metric using the new point.

The contraction of the point-pair with the lowest contraction error metric may comprise replacing the point-pair with a new point. The step of replacing the point-pair with a new point may then comprises any of selecting a position of one of the points in the point-pair that results in the lowest contraction error metric for the corresponding contraction and generating a new point at the selected position; and determining a position that minimises the contraction error metric for the corresponding contraction and generating a new point at the determined position.

The contraction error metric may be any of a sum of the squared distances between a new point generated as a result of the contraction and each point in an affiliated set of points arising from the contraction of the point-pair and a quadric error metric.

The iterative contraction of the point-pair with the lowest contraction error metric can continue until a predefined stop criteria is met.

According to a second aspect there is provided a computer readable medium storing computer interpretable instructions which when interpreted by a programmable computer cause the computer to perform a method in accordance with the first aspect.

According to a third aspect there is provided a computer system for implementing simplification of a point cloud that represents one or more three-dimensional objects or surfaces, the point cloud comprising a set of points. The system comprises a memory configured to store the point cloud, and a processor. The processor is configured to implement recursive spatial partitioning of the set of points into a hierarchy of clusters; for each cluster, calculate a tangent plane estimate for the points in the cluster and deriving a confidence factor for the calculated tangent plane estimate, wherein the confidence factor is a measure of the planarity of the points in the cluster; identify representative points within each cluster in the hierarchy and, for each representative point, define a point-pair that consists of the representative point and a representative point of an immediate parent cluster; calculate a contraction error metric for each point-pair that is weighted by the inverse of the confidence factors calculated for the clusters associated with each representative point; and iteratively contract the point-pair with the lowest contraction error metric, updating remaining point-pairs as a result of the contraction, and revise the contraction error metric of the updated point-pairs accordingly.

The present invention will now be more particularly described by way of example only with reference to the accompanying drawings, in which:

FIG. 1 is a flow diagram illustrating the method of point cloud simplification;

FIG. 2 is a flow diagram illustrating an exemplary process of recursive spatial partitioning of a set of points into a hierarchy of clusters;

FIG. 4b illustrates schematically a tree representation of the representative points of each cluster in the cluster hierarchy of FIG. 4a;

FIG. 6b illustrates an example of pseudo-connectivity generated for the point cloud of FIG. 6a;

FIG. 8 illustrates an example of a two-dimensional space that has been partitioned into a grid of cells;

Figure 3:
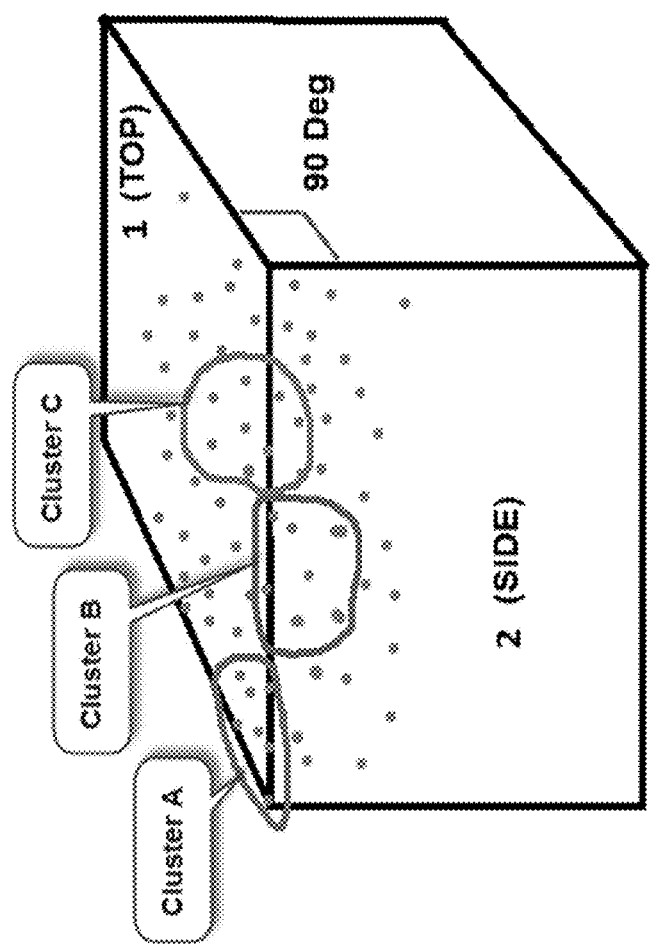
FIG. 3 illustrates an example of a 3D point cloud generated for a cuboid object.

In order to at least mitigate the problems identified above there will now be described a method of point cloud simplification, wherein a point cloud comprises a set of data points each of which is defined by a set of coordinates. FIG. 1 is a flow diagram illustrating the method of point cloud simplification. The method involves implementing divisive hierarchical clustering (S1) and then, for each cluster, calculating a tangent plane estimate for the points within/that make-up the cluster (S2) and calculating a confidence factor for the tangent plane estimate (S3) The confidence factor, and optionally the tangent plane estimate, are then saved as attributes for each cluster.

The cluster hierarchy is then used as means for identifying point-pairs (i.e. pairs of points) as candidates for contraction (S3), and a contraction error metric for each point-pair is calculated, wherein the contraction error metric is weighted by the inverse of the confidence factors/planarity measure calculated for the clusters associated with each representative point in the point-pair (S4). The point-pairs with the lowest contraction error metric are then iteratively contracted (S5) until a predefined stop criteria is met (S5).

In this regard, hierarchical clustering involves implementing recursive spatial partitioning of the set of points into a hierarchy of clusters. By way of example, FIG. 2 is a flow diagram illustrating an exemplary process of recursive spatial partitioning of a set of points into a hierarchy of clusters, which would typically involve defining the entire set of points as an initial root cluster (S1-1), partitioning the initial root cluster into a number of separate clusters (e.g. sub-clusters that each contain a subset of the points in the entire set) (S1-2), and recursively partitioning each cluster into further clusters (S1-3) until either a further cluster contains a single point (S1-4) or a predefined depth is reached (S1-5). This hierarchical clustering therefore recursively divides each cluster into smaller clusters containing fewer points.

As described above, for each cluster derived by the divisive hierarchical clustering step, an estimated tangent plane is calculated for the points in the cluster. In this regard, a tangent plane is a three-dimensional plane of infinite extent, defined at a specific orientation and placement. In other words, the tangent plane to a surface at a given point is the plane that just touches the surface at that point. When calculating a tangent plane estimate for a cluster, the orientation and placement of the tangent plane is made such that the squared distances from the tangent plane to all points in the cluster are minimized. Typically, a tangent plane for a cluster will touch a point that is closest to the mean of the points within the cluster/the centroid of the cluster of points. The minimum data required to define the tangent plane is then the normal vector to the plane at this point and the location of the plane relative to the origin. By way of example, the data used to represent and store the tangent plane can consist of four real numbers, the first three real numbers representing a normal vector (i.e. X, Y, Z) and the fourth being the offset of the plane from the origin. Alternatively, depending upon the implementation, it may be more convenient to represent and store the tangent plane using three real numbers representing a normal vector (i.e. X, Y, Z) and the three real numbers representing the coordinates of a point located on the plane (i.e. six real numbers in total).

There a number of possible algorithms that can used to calculate the tangent plane estimate. For example, a well-known approach is to use a least-squares method for plane fitting. By way of further example, Hoppe et al, "Surface Reconstruction from Unorganized Points" (SIGGRAPH 1992 proceedings) and Zhou et al. "Reconstructing Surface Discontinuities by Intersecting Tangent planes of Advancing Mesh Frontiers" (Advances in Modelling, Animation and Rendering (2002), pp 183-199) describe methods of estimating a tangent plane from a set of sample points. Methods such as these can therefore be used to determine a normal vector at the point/location within the cluster bounding box that can be used to define the estimated tangent plane for the cluster.

As outlined above, preferably, when calculating the tangent plane estimate for a cluster, a confidence factor for the tangent plane estimate is also derived. The value of this confidence factor is preferably low (e.g. towards 0.0) if the points in a cluster are randomly distributed throughout the 3D bounding box of the cluster, such that there is no easily discernible plane that closely fits the points. Conversely, if all of the points in a cluster lay on a planar surface, then the confidence factor is preferably high (e.g. 1.0). Consequently, this confidence factor could also be described as a non-dimensional scalar measure of the "planarity" of the points in the cluster.

Furthermore, in order for a tangent plane estimate to be calculated for a cluster the cluster must contain at least three points (as a minimum of three points are needed in order to define a surface/plane). Consequently, for a cluster that contains just one or two points, the confidence factor/planarity measure can be assumed to be zero without further consideration.

By way of example, one way to derive a planarity measure for a cluster as a confidence factor for the tangent plane estimate is to evaluate the relationship between the vector lengths of the eigenvectors (i.e. the eigenvalues) for the three principle axes of an ellipsoid fitting the cluster. If all eigenvectors are near the same length, then the planarity is low. If one clearly dominates from the others, then planarity is high. This is because the difference in the lengths indicates a long thin, and relatively flat/planar-like ellipsoid, whilst similar lengths would indicate a more spherical ellipsoid thereby indicating that there is not a plane that will closely fit all of the points in the cluster. The difference between the maximum and minimum eigenvector lengths/eigenvalues could therefore be used as an approximate measure for the planarity for the cluster, and therefore as a confidence factor for the tangent plane estimate.

In this regard, there are a number of different methods for fitting an ellipsoid to a number of 3D points. By way of example "Multi-dimensional Ellipsoidal Fitting" B. Bertoni, Department of Physics, South Methodist University, Tech. Rep. SMU-HEP-10-14, 2010, describes an algorithm for finding a multi-dimensional ellipsoid that fits a distribution of discrete data points. There are also various further known methods for determining a minimum volume enclosing ellipsoid of a set of points that could also be used as a basis for deriving a planarity measure for a cluster.

As an alternative, a confidence factor for the tangent plane estimate determined for a cluster could be based on the average squared distances between each of the points in the cluster and the tangent plane estimate. In particular, this could be implemented by calculating the sum of the squared distances to tangent plane estimate for each point in the cluster, and dividing that sum by the point count for the cluster (i.e. the number of points in the cluster) in order to get average squared distance. This value can then be used as the confidence factor/planarity measure for a cluster.

To illustrate the concept of planarity for the points in a point cloud, FIG. 3 shows an example of a 3D point cloud generated for a cuboid object, such that each point in the point cloud lies on the surface of a cuboid. In this example, the points in the point cloud are located on either the top surface (1) or the front surface (2) of the cuboid. FIG. 3 also illustrates three clusters (A, B, C) that have been defined for the point cloud. The points in cluster A all lie on the top surface (1) of the cuboid, with three points located on the edge where the top surface (1) meets the front surface (2). Similarly, the points in cluster B all lie on the front surface (2), with two points on the edge where the top surface (1) meets the front surface (2). In contrast, cluster C contains points that lie on both the top surface (1) and the front surface (2), with one point located on the edge where the top surface (1) meets the front surface (2).

When determining a tangent plane estimate for each of cluster A and cluster B, the calculated normal vector is well-defined, as all of the points in each cluster lie in the same plane and therefore have a high planarity (i.e. each normal vector will substantially align with the surface normals for the top (1) and front (2) surfaces respectively). A high confidence factor/planarity measure will therefore also be calculated for each of these clusters. In contrast, the tangent plane estimate for cluster C will not be as well-defined, as the normal vector for the tangent plane estimate will be somewhere between the surface normal of the top (1) and front (2) surfaces (e.g. at a 45° angle between the two surface normals), and will therefore have a lower confidence factor/planarity measure.

When calculating the contraction error metric for a point-pair in which each point in the pair is associated with a cluster, the associated confidence factor/planarity measure calculated for each cluster are combined, i.e. by multiplying the two confidence factors/planarity measures, and the inverse of the combined confidence factor/planarity measure is then used as a weighting factor in the calculation of the contraction error metric for the contraction of the two representative points.

Optionally, the step of calculating the contraction error metric can also take into account the co-linearity/alignment of the tangent planes calculated for the clusters associated with each representative point in the point-pair. By way of example, when considering a point-pair comprising the representative points associated with two clusters $C_1$ and $C_2$, one option is to determine the dot product of the normal vectors of the tangent plane estimates calculated for each of $C_1$ and $C_2$ as a measure of the co-linearity/alignment of the tangent plane estimates. If the two normal vectors (and therefore their tangent plane estimates) are dissimilar/diverge, then the dot product of their normal vectors will be low (e.g. toward 0), and the planarity of the cluster $C_{1,2}$ resulting from the contraction will be determined to be low. In contrast, if the two are both nearby spatially, and have similar normal vectors, then the dot product will be relatively high (e.g. towards 1 if the normal vectors are unit vectors), and the planarity of the cluster $C_{1,2}$ resulting from the contraction will then be determined to be high. When two clusters are contracted, the respective confidence factors/planarity measures of the two clusters are then multiplied.

Alternatively, when the calculation of the contraction error metric uses a quadric error metric, as described further below, the data representing the tangent plane estimates can be included as weighted attributes. The calculation of the contraction error metric using this approach would then implicitly compare the tangent planes associated with each cluster thereby taking into account the co-linearity/alignment of the tangent planes.

When the step of calculating the contraction error metric also takes into account the co-linearity/alignment of the tangent planes calculated for the clusters associated, data defining the tangent plane estimate determined for each cluster must also be stored. In this regard, the minimum data required to define the tangent plane is the normal vector to the plane and the location of the plane relative to the origin. By way of example, the data used to represent and store the tangent plane can consist of four real numbers, the first three real numbers representing a normal vector (i.e. X, Y, Z) and the fourth being the offset of the plane from the origin. Alternatively, depending upon the implementation, it may be more convenient to represent and store the tangent plane using three real numbers representing a normal vector (i.e. X, Y, Z) and the three real numbers representing the coordinates of a point located on the plane (i.e. six real numbers in total).

Following the hierarchical clustering of the points in the point cloud, and the calculation of the tangent plane estimates for each cluster, point-pairs can then be identified by identifying representative points within each cluster in the hierarchy and, for each representative point, defining a point-pair that consists of the representative point and a representative point of an immediate parent cluster. In this regard, the representative point of a branch/internal cluster could be the point that is closest to the mean of the points within the cluster (i.e. a centre point of the cluster), whilst for a leaf/external cluster, each point within the cluster could be considered to be a representative point of that cluster. Consequently, where a branch/internal cluster is the immediate parent of multiple further clusters, then the representative point of that cluster will be included within multiple point-pairs of the point-pairs that are defined for the hierarchy of clusters. Conversely, each representative point within a leaf/external cluster will only be included within a single point-pair of the point-pairs that are defined for the hierarchy of clusters; however, each leaf/external cluster could include multiple representative points.

By way of example, FIG. 3a illustrates schematically a tree representation of a simple example of a cluster hierarchy formed as a result of divisive hierarchical clustering of a set of points. The initial root cluster ($C_1$) includes all of the points in the set to be simplified. Each sub-cluster ($C_2$ to $C_{17}$) then includes a subset of the points that are part of the initial root cluster ($C_1$). In FIG. 3b, the representative point(s) ($RP_n$) within each cluster ($C_n$) illustrated in FIG. 3a have been identified, and a point-pair has then been defined as the combination of each representative point with the representative point of the immediate parent cluster. To illustrate this, each of the point-pairs present in FIG. 3b are shown as encircled by a dashed line. The point-pairs of the example of FIG. 3b therefore include:

| | | | | | | | | |
|---|---|---|---|---|---|---|---|---|
| | $RP_1$-$RP_2$ | | | | | $RP_1$-$RP_3$ | | |
| $RP_2$-$RP_4$ | | $RP_2$-$RP_5$ | | $RP_3$-$RP_6$ | | $RP_3$-$RP_7$ | $RP_3$-$RP_8$ | |
| $RP_4$-$RP_9$ | $RP_4$-$RP_{10}$ | $RP_5$-$RP_{11}$ | $RP_5$-$RP_{12}$ | $RP_6$-$RP_{13}$ | $RP_6$-$RP_{14}$ | $RP_6$-$RP_{15}$ | $RP_8$-$RP_{16}$ | $RP_8$-$RP_{17}$ |

It is noted that this example has assumed that each leaf/external cluster contains only a single representative point. However, if one or more of the leaf/external clusters includes more than one representative point, then further point-pairs would be defined. For example, if cluster $C_9$ were to contain two representative points (i.e. $RP_{9-1}$ and $RP_{9-2}$), then the point-pairs that are defined for the hierarchy of clusters would include both $RP_4$-$RP_{9-1}$ and $RP_4$-$RP_{9-2}$.

Figure 4A:
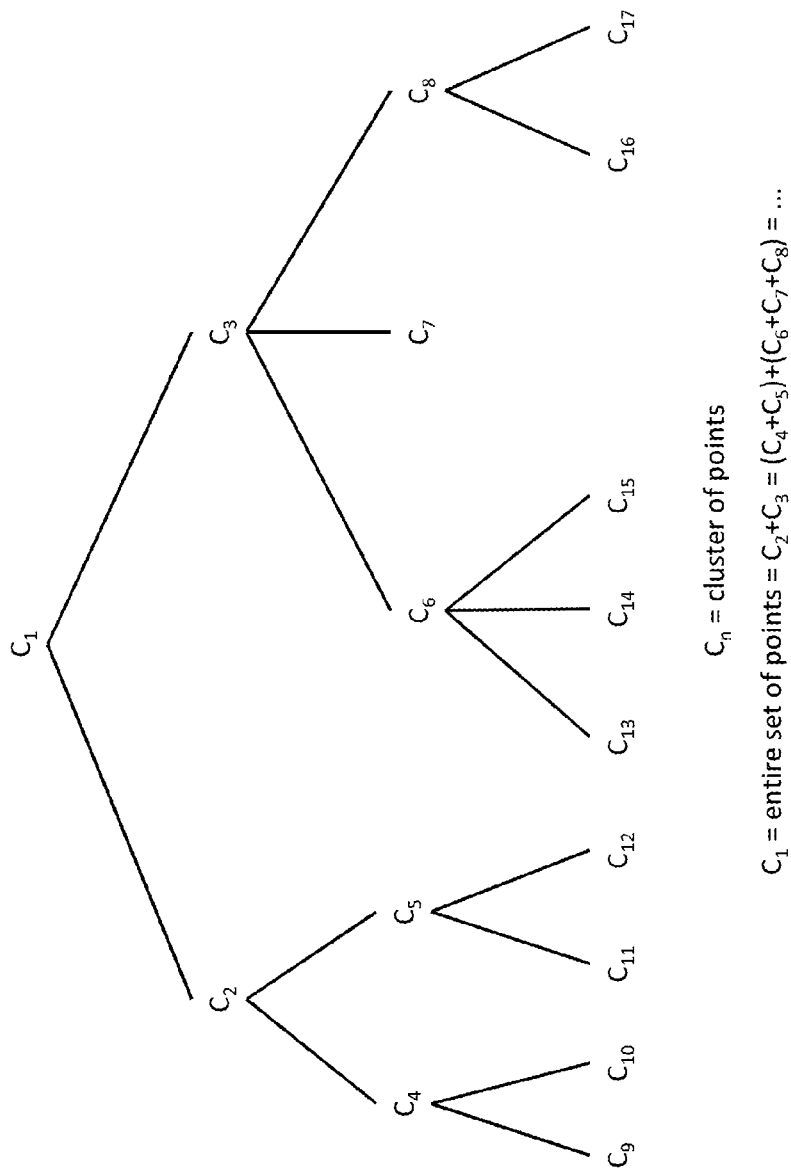
FIG. 4a illustrates schematically a tree representation of a simple example of a cluster hierarchy.
Figure 4B:
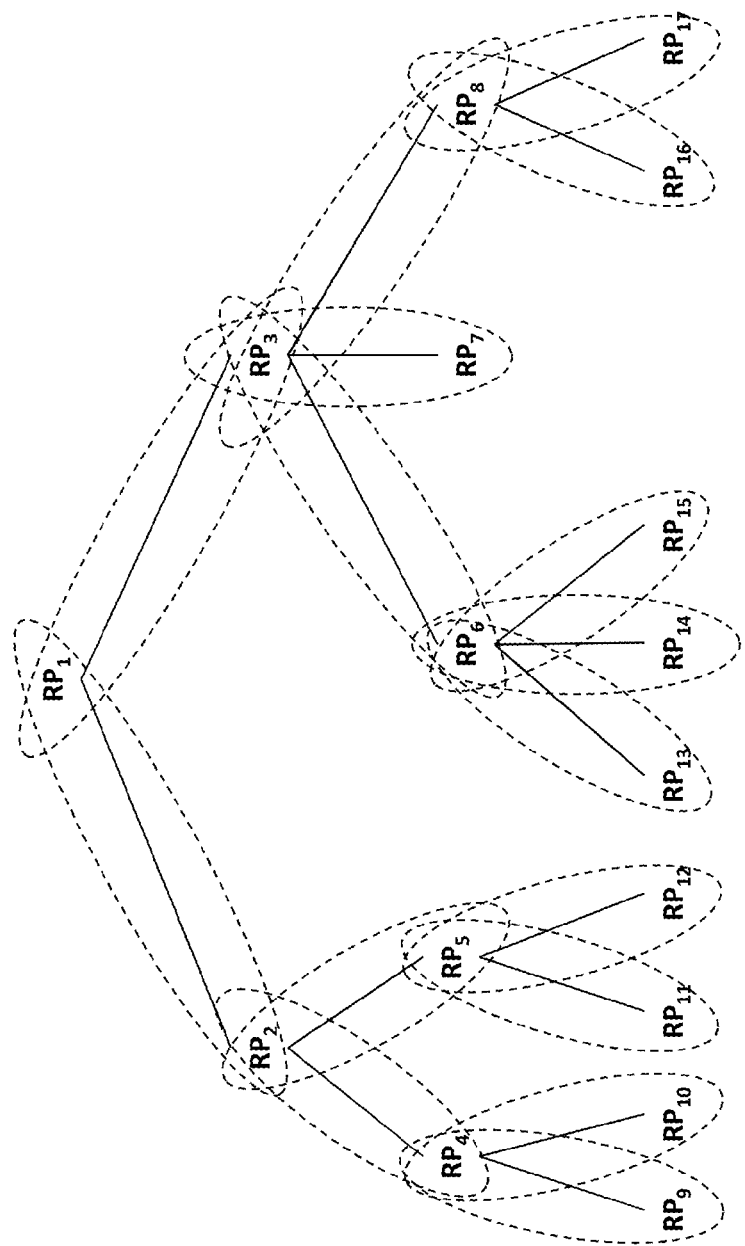

In addition, in the examples illustrated in FIGS. 4a and 4b, the divisive hierarchical clustering has resulted in a cluster hierarchy in which there are leaf/external clusters at different depths within the hierarchy, as leaf/external cluster $C_7$ occurs at a depth of 2 whilst the remaining leaf/external clusters occur at a depth of 3. This would occur if the divisive hierarchical clustering process resulted in cluster $C_7$ containing only a single point, such that there would be no further spatial partitioning of this cluster, whilst further spatial partitioning of the other clusters at that depth is still possible. For example, this could occur for parts of point cloud that are sparse relative to other parts. However, it is also possible that the divisive hierarchical clustering process would result in a cluster hierarchy in which the leaf/external clusters are all at the same depth within the hierarchy.

Once all of the point-pairs within the set of points have been identified (i.e. as candidates for contraction), then the contraction error metric of each point-pair is calculated. The contraction of the point-pair with the lowest contraction error metric then comprises replacing both of the points in the point-pair with a new, replacement point. For example, the replacement point could either be located at the position of whichever one of the points in the point-pair to be contracted that results in the lowest contraction error metric for the corresponding contraction, or at a position that minimises the contraction error metric for the corresponding contraction.

Figure 5:
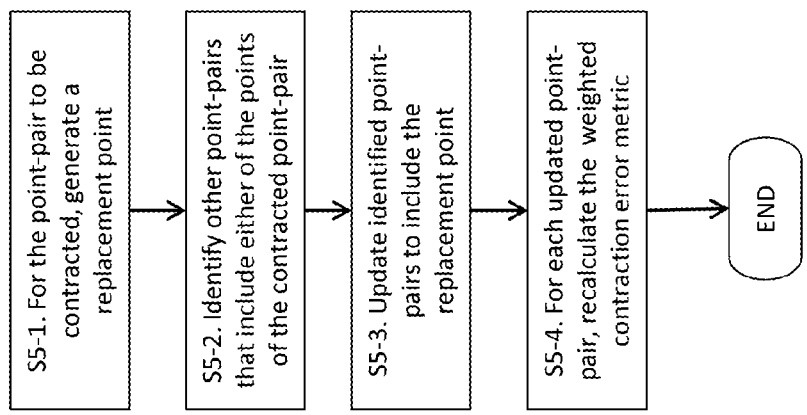
FIG. 5 is a flow diagram illustrating an example of a process that could occur for each point-pair contraction.

After each point-pair contraction, the remaining point-pairs are updated as a result of the contraction, and the contraction error metric of the updated point-pairs is then revised accordingly. By way of example, FIG. 5 is a flow diagram illustrating an example of a process that could occur for each point-pair contraction. For the point-pair to be contracted (i.e. the point-pair with the lowest contraction error metric), a replacement point is generated that will replace both points in the point-pair (S5-1). Then, in order to update the remaining point-pairs to reflect the result of the contraction, any other point-pairs that include either of the points that are included in the contracted point-pair are identified (S5-2), and these identified point-pairs are updated to include the replacement point generated as a result of the contraction (i.e. in place of the point that was involved in the contraction) (S5-3). Then, for each of the point-pairs that are updated to include the replacement point resulting from the contraction, the contraction error metric is recalculated using the replacement point (S5-4).

It should be noted that the process described above in relation to FIG. 5 is exemplary only. In particular, it is noted that the order steps of the process outlined above could be modified whilst achieving the same result. For example, the step of identifying other point-pairs that include either of the points that are included in the contracted point-pair could be implemented before the replacement point (i.e. that will result from the contraction) is generated.

Preferably, as a result of calculating the contraction error metric of each point-pair, a contraction priority queue is defined in which the point-pair with the lowest contraction error metric is first in the contraction priority queue. In this case, the contraction priority queue would then be updated after each contraction in order to reflect updates in the calculated contraction error metrics of the updated point-pairs, such that the point-pair with the lowest contraction error metric is again first in the contraction priority queue even if the contraction error metrics have changed as a result of the preceding contraction. Consequently, the contraction priority queue should be implemented in such a way that it can be efficiently updated following changes to the calculated contraction error metrics of any updated point-pairs. By way of example, one possible way of achieving this would be to implement the contraction priority queue as a Fibonacci heap, which comprises a collection of trees that satisfy the minimum-heap property. This results in $O(N \log(N))$ overall complexity for average case (when each point is connected only to limited percent of all points). However, this is merely an example, and other methods could also be used to implement the contraction priority queue.

In addition, as this method is implemented in a computer, it is preferable that, following the hierarchical clustering, a logical tree is generated by identifying representative points within each cluster in the hierarchy, defining the representative points as nodes of the logical tree, and, for each representative point, defining an edge of the logical tree as a point-pair that consists of the representative point and a representative point of an immediate parent cluster. In this regard, the tree representation of FIG. 4b effectively illustrates an example of a logical tree in which the nodes are the representative points ($RP_n$) of each cluster, and the edges comprise the point-pairs defined for the hierarchy, as illustrated by the lines connecting the representative points within each cluster with the representative point within it's immediate parent cluster.

Figure 6B:
Figure 6A:
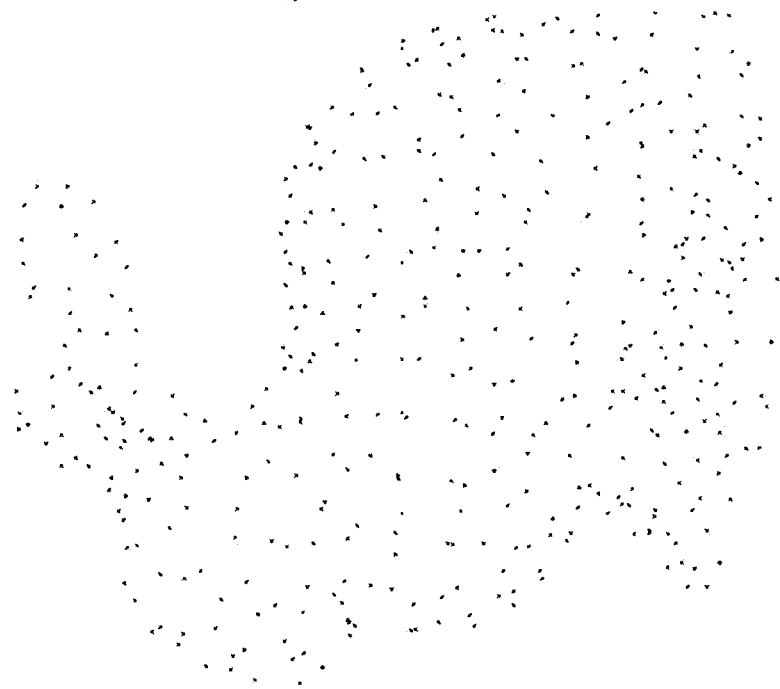
FIG. 6a illustrates an example of unprocessed point cloud representation.

To further illustrate the logical tree generated by the methods described herein, FIG. 6a illustrates an unprocessed point cloud representation of the well-known Stanford bunny, and FIG. 6b then illustrates the pseudo-connectivity of the points of this point cloud generated when a logical tree is formed in accordance with the methods described herein.

Figure 7A:
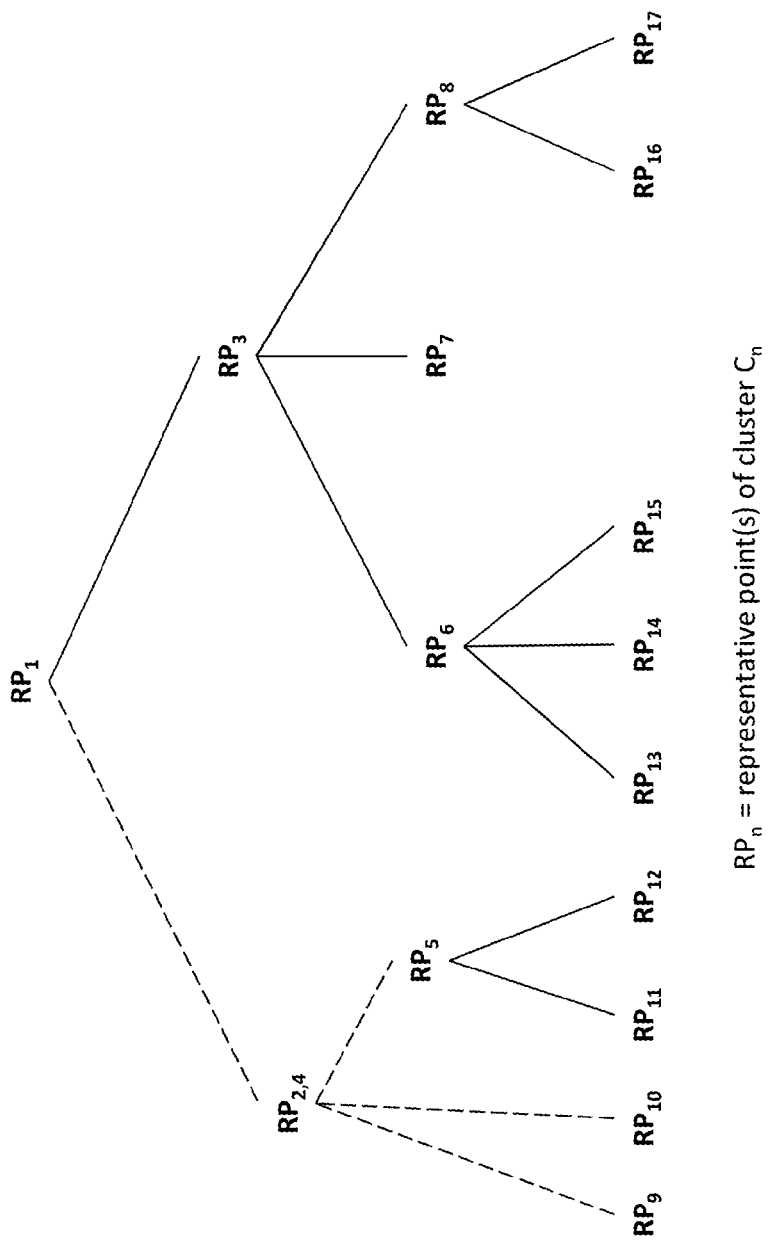
FIG. 7a illustrates a tree representation of the result of an exemplary first contraction of the tree illustrated in FIG. 4b.

When a logical tree is generated following the hierarchical clustering, after each point-pair contraction, the logical tree is updated as a result of the contraction of the point-pair such that the remaining point-pairs that are affected by the contraction reflect the result of the contraction. By way of example, FIG. 7a illustrates a tree representation of the result of an exemplary first contraction of point-pair $RP_2$-$RP_4$ of FIG. 4b. This example contraction results in a new, replacement point $RP_{2,4}$ that replaces both $RP_2$ and $RP_4$. Moreover, as a result of the contraction, the edges of the logical tree that involved either of $RP_2$ and $RP_4$ are updated to include replacement point $RP_{2,4}$ instead. This updating of the edges of the logical tree is illustrated by the dashed lines in FIG. 7a.

Figure 7B:
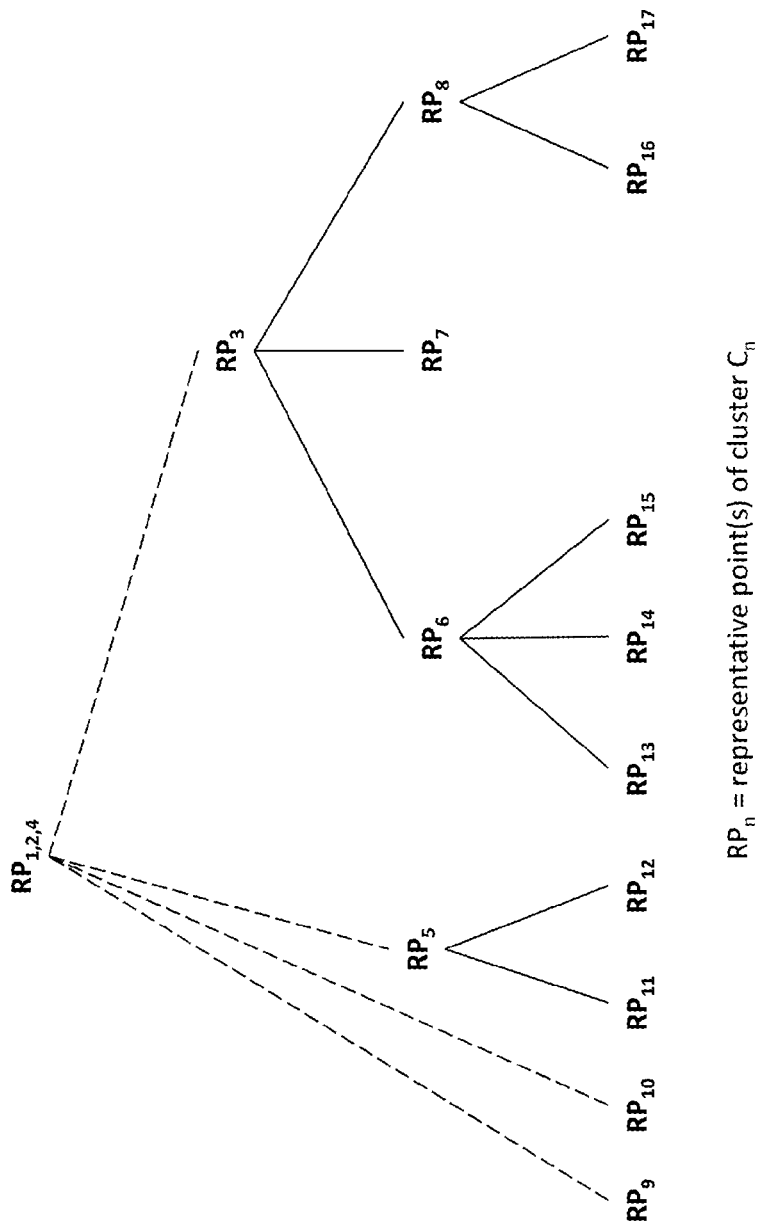
FIG. 7b illustrates a tree representation of the result of an exemplary second contraction of the tree illustrated in FIG. 4b.

FIG. 7b then illustrates a tree representation of the result of an exemplary second contraction of the tree illustrated in FIG. 4b. In this second contraction, the updated point pair $RP_1$-$RP_{2,4}$ resulting from the first contraction is contracted such that replacement point $RP_{1,2,4}$ replaces both $RP_1$ and $RP_{2,4}$ (which replaced $RP_2$ and $RP_4$). Once again, the edges of the logical tree that involved either of the points in the contracted point-pair (i.e. $RP_1$ and $RP_{2,4}$) are updated to include replacement point $RP_{1,2,4}$ instead. This updating of the edges of the logical tree is illustrated by the dashed lines in FIG. 7b.

The use of a logical tree comprising the representative points of each cluster within a cluster hierarchy (i.e. generated by the spatial hierarchal clustering of a point cloud) provides an efficient means for identifying candidate point-pairs for contraction. In this regard, as each of the points within the point cloud will be included within a leaf/external cluster, all of the points will eventually become a representative point of a cluster. Therefore, as there is an edge defined between each representative point and the representative point of it's immediate parent cluster (other than for the representative point of the root cluster), the number of edges in such a logical tree is linearly dependent on number of points in the point cloud. Moreover, such a logical tree provides a path (i.e. a sequence of edges, each of which defines a candidate for contraction) between all points in the point cloud, such that the above described method of point cloud simplification provides that any point cloud could be simplified to a single point by traversing this path. In addition, the tree structure of such a logical tree maintains the relative distance between points in the point cloud, as the closer any two points are in the point cloud the fewer edges (i.e. a shorter sequence of contractions) there will be in the path between the two points in the logical tree. The use of such a logical tree therefore captures simplification bias, whilst also providing good computational performance.

There are a number of methods of recursive spatial partitioning that could be used to generate a cluster hierarchy. For example, k-dimensional (k-d) tree spatial partitioning recursively splits space into two half-spaces by generating a splitting hyperplane that divides a space into two parts. By way of further example, octree tree spatial partitioning recursively subdivides space into eight octants. Whilst the hierarchical clustering of the set of points could be implemented using the known recursive spatial partitioning methods that use a fixed pattern of partitioning, it is preferable to implement a recursive spatial partitioning method that uses a variable pattern of partitioning, thereby giving a high-level of control over the depth of the hierarchy and the number of points in each cluster. In this regard, a fixed pattern of partitioning involves splitting space into a fixed number of sub-spaces at each recurrence, whereas for a variable pattern of partitioning the number of sub-spaces generated can vary at each recurrence When implementing the hierarchical clustering of the points in a point cloud using a computer, it may be preferable that the set of data points that make up the point cloud are placed into an array, effectively defining the initial root cluster. This array can be viewed as left-closed right-open range, i.e. [first, last).

Each point in the point cloud will fall into a cell, wherein a cell is aligned on the bounding box encompassing the points in a cluster. By way of example, FIG. 8 illustrates a simple example of a two-dimensional space that has been partitioned into a grid of cells. In this example, the tuple of indices of a cell comprises a 2-tuple, wherein the numbers in the 2-tuple index the position of the cell in the x-coordinate and y-coordinate directions respectively. Therefore, within each level of the hierarchy, each point can be mapped to the tuple of indices of the cell in which the point is located, with the cell representing the cluster in which the point has been placed. Clustering can then be achieved by performing an in-place partition of the set of points in the array into groups which fall into the same cell, i.e. which have the same tuple of indices.

For example, this in-place partitioning could be implemented using a comparison-based sorting algorithm such as Introsort, wherein the ordering relationship uses a lexicographical comparison of tuple indices. This results in O(N log(N)) complexity for the clustering of one cell with N points into sub-cells. As an alternative example, the in-place partitioning could be implemented using an integer-based sorting algorithm such as radix sort or counting sort. In this case, the indices in the tuple are mapped to one integer which is then used as sorting key. This results in O(kN) complexity for the clustering of one cell with N points into sub-cells, where k is number of digits used during sorting. For many practical applications k is small and fixed such that complexity then becomes O(N).

Figure 9:
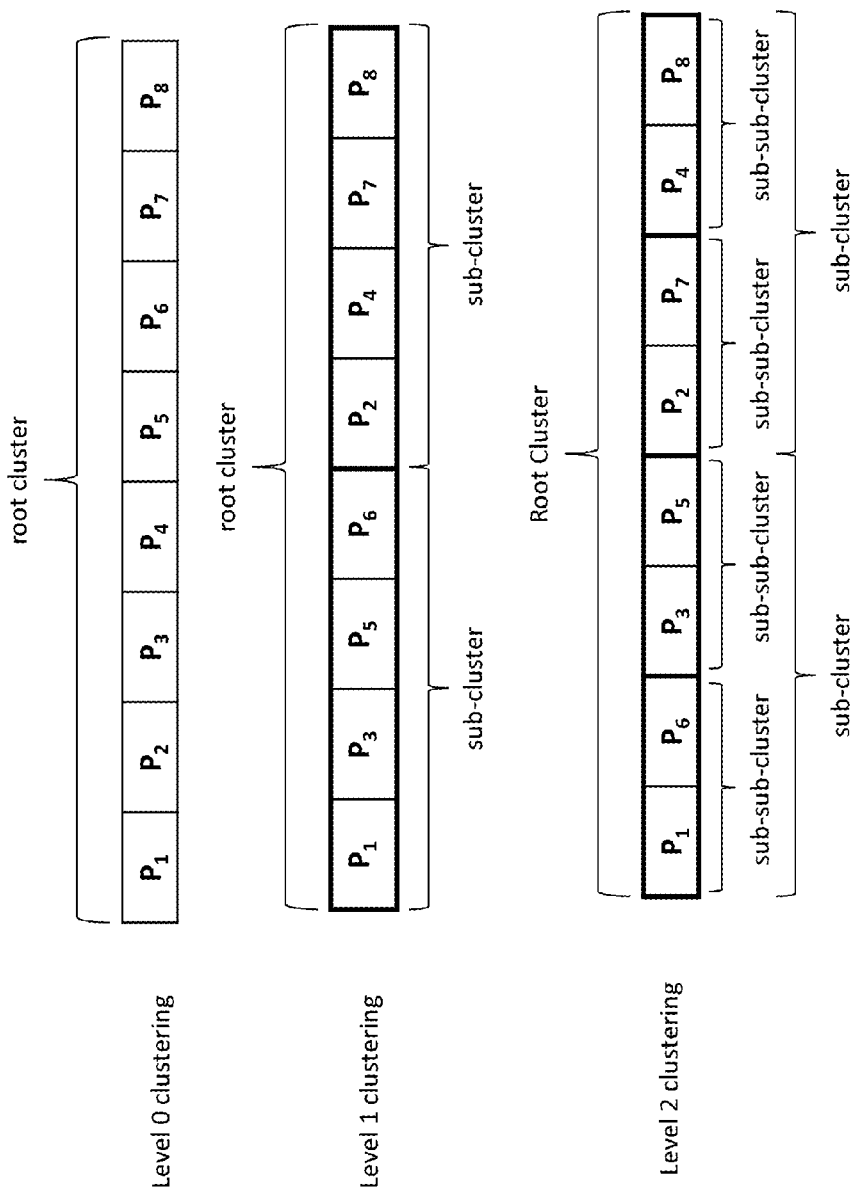
FIG. 9 illustrates schematically the in-place partitioning of a set of points within an array.

The in-place partitioning of the set of points results in the points being grouped into their corresponding clusters within the array. This is illustrated schematically in FIG. 9 for a simple array of eight points (P1 to P8) that has undergone two levels of hierarchical clustering.

The recursive clustering method stops when it is determined that a cluster has only one point, or if a predefined traversal depth level is reached. This results in O(dN) complexity for full hierarchical clustering, where d is depth level and is usually log(N), resulting in O(N log(N)) overall complexity using integer-based sorting. Such a divide-and-conquer hierarchical clustering method exposes an important performance property, in that it is an optimal cache-oblivious algorithm, i.e. it uses the memory/cache hierarchy optimally, in an asymptotic sense. Eventually, during the division of cell size, the cluster will fit fully into the highest level of processor cache (e.g. such as the L3 cache of modern CPUs), which means that all processing of its points, within all of its sub-clusters within hierarchy will happen within that cache level. Moreover, points of deeper levels will fully fit into lower cache levels, such as L2, and so on.

Preferably, the contraction error metric would be a sum of the squared distances between a new, replacement point generated as a result of the contraction and each point in an affiliated set of points arising from the contraction of the point-pair. In this regard, each point can be considered to have an implicit set of affiliated points that comprises all of the points of the original point cloud that the point has replaced (i.e. as a result of a contraction of a point-pair). Therefore, in the initial point cloud, the affiliated set of each point includes only the point itself, as no contractions have taken place. For a replacement point that has been generated as the result of the contraction of one or more point-pairs, the affiliated set will include all of the points of the original point cloud that have been contracted to generate that replacement point.

To illustrate this, for a point in a point cloud $P_n$ the affiliated set of the point can be represented as:

Affiliated set of $P_n = P_n$

Similarly, for a replacement point that has been generated as the result of the contraction of a point-pair, the affiliated set of the point can be represented as:

Affiliated set of $P_{n,m} = P_n, P_m$

Therefore, when two points $P_A$ and $P_B$ are contracted, their affiliated sets are merged and the resulting affiliated set is then associated with the replacement point $P_C$ (which is result of the contraction). The computed error of this contraction would therefore be the sum of squared distances between all points in affiliated set and point $P_C$:

$$\text{Error} = \Sigma (Pi - P_C)^2 \quad \text{Equation 1}$$

where Pi is a point in the affiliated set of point $P_C$ (i.e. the merged affiliated sets of points $P_A$ and $P_B$).

Consequently, the error is initially zero, as the affiliated set of each point includes only itself. Then, as the simplification process proceeds, the error increases as the affiliated sets associated with the points in the simplified point cloud grow with each contraction. In addition, the distances between points can be measured in n-dimensional space, which allows the simplification process to respect additional attributes of the point cloud. By way of example, the coordinate set of each point in the point cloud could include both colour and texture coordinates, such that each point would be represented by a 6-tuple (i.e. x, y, z, r, g, b, u, v). The simplification method can therefore take into account dimensions that are configurable according to application requirements, from pure geometry (x,y,z) to multiple attributes weighted by application-specific factors.

In this regard, the confidence factor/planarity measure calculated for a tangent plane estimate is a unit-less scalar attribute, and the inverse of this value can therefore be included as one of the attributes that are included within the coordinate set of a point, and can therefore be used in the calculation of the contraction error metric. As described above, in an optional embodiment, when the tangent plane estimates calculated for each cluster are stored, the values representing the tangent plane estimates for a cluster can also be included in the coordinate set of the clusters representative point, and can therefore be used in the calculation of the contraction error metric.

With respect to the contraction error metric given in Equation 1, it has been shown that for the purpose of such an error measure affiliated sets of simplexes (e.g. triangles, line segments, tetrahedrons, and so on) can be maintained implicitly in constant space using the quadric (Q). The contraction error can therefore be approximated using a quadric error metric that will be described further below. The concept of the quadric error metric is also discussed in detail in Michael Garland and Paul S. Heckbert "Surface Simplification Using Quadric Error Metrics", 1997, and Michael Garland and Paul S. Heckbert "Simplifying Surfaces with Color and Texture using Quadric Error Metrics", 1998.

With regards to the quadric error metric, the squared distance ($D^2$) between two points (p and x) can be calculated as:

$$D^2 = (p-x)^2 = (p-x)^T(p-x) = x^T x - x^T p - p^T x + p^T p = x^T x - 2x^T p + p^T p \quad \text{Equation 2}$$

whilst the quadric (Q) can be defined as:

$$Q_p(x) = x^T I x - 2x^T p + p^T p \quad \text{Equation 3}$$

It can therefore be seen that quadric (Q) defined by equation 3 evaluates to the squared distance between given point x and p, and this quadric (Q) can be stored as tuple of matrix, vector and scalar:

$$Q = (A, b, c) = (I, p, p^T p) \quad \text{Equation 4}$$

Moreover, a component wise addition of quadrics can be performed such that:

$$Q_1(x) + Q_2(x) = (Q_1 + Q_2)(x) \quad \text{Equation 5}$$

$$Q_1 + Q_2 = (A_1 + A_2, b_1 + b_2, c_1 + c_2) \quad \text{Equation 6}$$

The sum of a plurality of quadrics is therefore another quadric which represents sum of squared distances to each underlying point. In other words, one quadric can be used to represent a set of points, and the addition of two or more quadrics can then represent the union of the sets of points represented by the summed quadrics. Consequently, for a contraction of the point-pair $P_1$-$P_2$, the associated error due to the contraction is the sum of squared distances from the replacement point $P_R$ to affiliated simplexes, which is given by:

$$\text{Contraction Error} = (Q_1 + Q_2)(P_R) \quad \text{Equation 7}$$

If we only use the quadrics of points, then the matrix component A will always be of form nI, and can then be stored as one scalar n. However, in general, quadrics can be used to represent distances to arbitrary simplexes, and such quadrics will have more complicated structure of A matrix (i.e. non-identity).

In addition, as each point can be represented by a quadric Q, which also represents a set of affiliated points associated with the point (i.e. by summed quadrics), quadrics can also be used to determine the location of the replacement point that is generated as a result of a point-pair contraction. For example, for the point-pair ($P_1$-$P_2$) that is to be contracted, if the replacement point is to be located at the position of whichever one of the points in the point-pair that results in the lowest contraction error metric, then these can be determined using the quadrics of each point (i.e. $(Q_1+Q_2)(P_1)$ and $(Q_1+Q_2)(P_2)$) and the results compared to determine which results in the lowest error. Alternatively, if the replacement point is to be located at a position that minimises the contraction error metric for the corresponding contraction, then these can be determined using the quadric to finding the optimal position which minimizes sum of squared distances to affiliated simplexes for which $$Q(x) \rightarrow \min: x = -A^{-1} b \quad \text{Equation 8}$$

Furthermore, as the confidence factor/planarity measure derived for a clusters tangent plane estimate is a unit-less scalar attribute, it can be considered along with other attributes using the quadric error measure methods described above. Hence there is no additional work required during the contraction operations (i.e. during traversal of the logical tree generated for the cluster hierarchy). The generation of planarity estimates only need occur once for fine-grain clusters at or near the leaf positions of the edge tree, prior to simplification.

The iterative contraction of the point-pair with the lowest contraction error metric continues until a predefined stop criteria is met. By way of example, the stop criteria could comprise one or more of the following:

i. a predefined percentage reduction threshold, wherein the number of points in the set is reduced until this percentage reduction threshold is reached;

ii. a predefined maximum number of points threshold, wherein the number of points in the set is reduced until the number of points in the reduced set is equal to or less than the threshold maximum number of points;

iii. a predefined maximum file size threshold, wherein the number of points in the set is reduced until the (data) size/volume of the reduced set of points is equal to or less than the threshold maximum file size;

iv. a predefined minimum number of contracted points threshold, wherein the number of points in the set is reduced until the number of points that have been contracted is equal to or greater than the threshold minimum number of contracted points;

v. a predefined accuracy or error measure threshold, wherein the number of points in the set is reduced until the accuracy or error measure threshold is reached;

vi. a predefined maximum spatial distance tolerance, where only point pairs that fall within this distance may be contracted, such that the number of points in the set is reduced until no further point pairs can be contracted.

Figure 10:
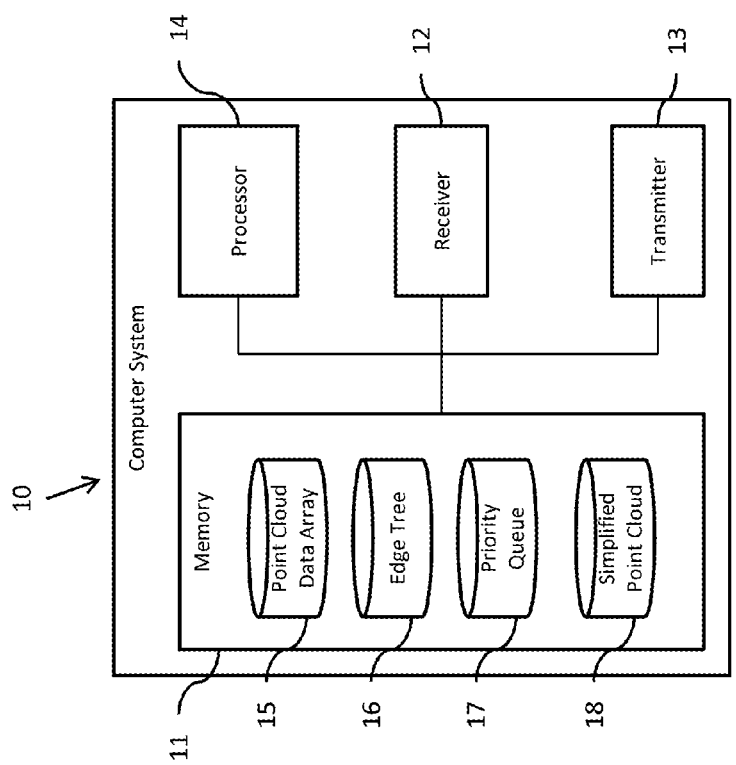
FIG. 10 illustrates schematically an embodiment of a computer system 10 suitable for implementing the methods described herein.

FIG. 10 illustrates schematically an embodiment of a computer system 10 suitable for implementing the methods described herein. The system 10 can be implemented as a combination of computer hardware and software, and comprises a memory 11, a receiver 12, a transmitter 13, and a processor 14. Whilst the system 10 has been illustrated schematically as single device (e.g. server or computer) comprising a single occurrence of each of the functional elements listed above, the system could equally comprise multiple occurrences of each functional element and could equally be provided by a plurality of separate devices that cooperate to provide the required functionality. By way of example, separate aspects of the functionality of the system could be distributed between a number of separate servers or computer devices, such that a first group of one or more servers/computer devices implements all of the necessary processing and interface functions whilst a second group of one or more servers/computer devices provides database functionality (e.g. including storage, security, data integrity etc).

The memory 11 typically stores the various programs/executable files that are implemented by the processor 14, an array of point cloud data 15 (including the coordinates and/or attributes of each point), a table defining the edges of a logical tree formed by the point cloud data (i.e. defining the candidate point pairs) 16, a contraction priority queue 17, the resulting simplified point cloud data 18 (including the coordinates and/or attributes of each point in the simplified point cloud), and any other data that may be of use to the system 10.

The processor 14 is configured to processing requires to implement the simplification of the point cloud data in accordance method for simplification of a point cloud. In particular, the processor 14 is configured to implement recursive spatial partitioning of the set of points into a hierarchy of clusters and then, for each cluster, to calculate a tangent plane estimate for the points within/that make-up the cluster. The processor 14 is also configured to calculate a confidence factor/planarity measure for the calculated tangent plane estimates and to ensure that the calculated confidence factor/planarity measure for the cluster is stored in the memory 11 as an attribute for the cluster. Optionally, the processor 14 can also ensure that the tangent plane estimate for the cluster is stored in the memory 11 as an attribute for the cluster.

The processor 14 is further configured to identify representative points within each cluster in the hierarchy, and to define point-pairs that consist of a representative point within a cluster and a representative point of an immediate parent cluster. The processor 14 is also configured to calculate a contraction error metric for each point-pair, wherein the contraction error metric is weighted by the inverse of the confidence factors/planarity measure calculated for the clusters associated with each representative point in the point-pair and, optionally, weighted by the tangent plane estimates calculated for the clusters associated with each representative point in the point-pair.

The processor 14 is further configured to implement the iterative contraction of the point-pair with the lowest contraction error metric, update remaining point-pairs as a result of the contraction, and revise the contraction error metric of the updated point-pairs accordingly. To do so, the processor 14 can implement one or more programs/executable files that has been provided by a computer readable medium storing computer interpretable instructions which when interpreted by the computer system cause the computer to perform the methods described herein.

The point cloud simplification method described herein provides a number of advantages. In particular, the method achieves optimum sample selection minimizing distortions and preserving features which may be lost when using conventional clustering or decimation. The method also provides high performance for large point clouds, achieving O(N*log(N)) scaling with the number of points, and also allows for an arbitrary level of simplification that is not constrained by a lattice. The method requires little control from users through the use of scale-independent parameters.

Figure 11A:
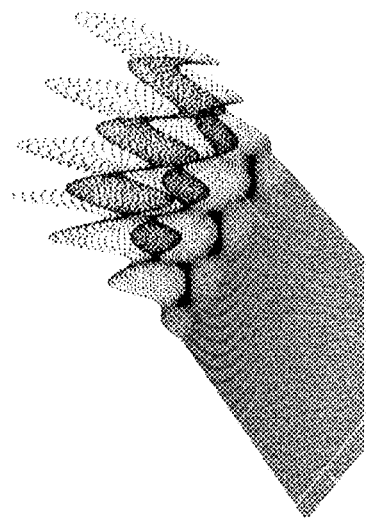
FIG. 11a illustrates an exemplary point cloud that represents a surface with an increasing vertical wave.
Figure 11C:
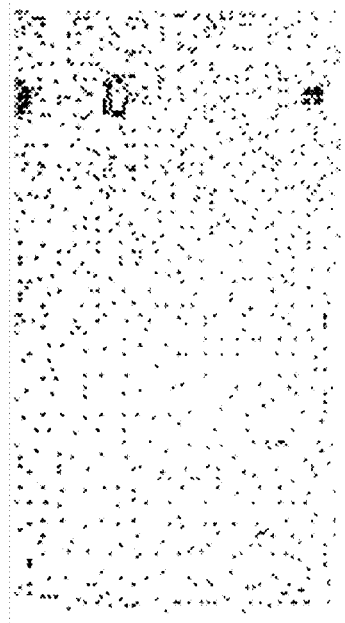
FIG. 11c illustrates a plan view of the point cloud of FIG. 11a after simplification using the methods described herein.
Figure 11B:
FIG. 11b illustrates a plan view of the point cloud of FIG. 11a after simplification without the use of tangent plane estimates and associated confidence factors.

Furthermore, the method described herein specifically preserve edges and areas of high curvature over flat areas. To illustrate this effect, FIG. 11a illustrates a point cloud of 20,000 points that represents a surface with an increasing vertical wave. FIG. 11b then illustrates a plan view of the point cloud of FIG. 11a after simplification to 1,000 points, wherein the simplification of the point cloud has been implemented without the use of tangent plane estimates and associated confidence factors when iteratively contracting point-pairs with the lowest contraction error metric. In contrast, FIG. 11c then illustrates a plan view of the point cloud of FIG. 11a after an alternative simplification to 1,000 points, wherein this alternative simplification of the point cloud has been implemented with the use of tangent plane estimates and associated confidence factors when iteratively contracting point-pairs with the lowest contraction error metric. In FIG. 11b it can be seen that there is a slight increase in the density of the points from left to right. However, in FIG. 11c it can be seen that are three distinct clusters with a higher density of points near peaks of waves in the point cloud.

In the above described method, the contraction error metric is weighted by the confidence factors/planarity measure calculated for the clusters associated with each representative point in the point-pair and, optionally, the calculated tangent plane estimates; however, there are additional ways in which these planarity attributes can be used to improve the visibility of areas of the object or surface represented by the point cloud. These additional aspects include:

a) In addition to including the confidence factor/planarity measure of a cluster as a separate attribute for the cluster during simplification, the calculated value can also be used to assign or modify the colour values associated with the points in the cluster. For example, the confidence factor/planarity measure (i.e. in the range of 0 to 1) can be used to perform a lookup in a table that maps colours with values in the range of possible values available for the confidence factor/planarity measure. Alternatively, the confidence factor/planarity measure can be used as a factor for multiplying the existing colour values associated with the points in the cluster. This approach can therefore be used to visually differentiate between areas of high curvature and planar areas.

b) As an alternative, in addition to including the confidence factor/planarity measure of a cluster as a separate attribute for the cluster during simplification, the tangent plane estimate associated with a cluster can also be used to apply shading to a cluster. For example, by evaluating a surface shading reflectance transfer function for a combination of the normal vector of the tangent plane estimate and a light source direction vector, a shading illuminance estimate can be derived for each cluster. The colour values of the representative point of the cluster, or all points in the cluster, can then be modified by this shading estimate to improve the visual differentiation between areas of high curvature and planar areas, where variations of curvature and orientation of sampled surfaces vary to and from the virtual light source.

It will be appreciated that individual items described above may be used on their own or in combination with other items shown in the drawings or described in the description and that items mentioned in the same passage as each other or the same drawing as each other need not be used in combination with each other. In addition, the expression "means" may be replaced by actuator or system or device as may be desirable. In addition, any reference to "comprising" or "consisting" is not intended to be limiting in any way whatsoever and the reader should interpret the description and claims accordingly.

Furthermore, although the invention has been described in terms of preferred embodiments as set forth above, it should be understood that these embodiments are illustrative only. Those skilled in the art will be able to make modifications and alternatives in view of the disclosure which are contemplated as falling within the scope of the appended claims. For example, in the above described embodiments, the contraction error metric is weighted by the confidence factors/planarity measure calculated for the clusters associated with each representative point in the point-pair and, optionally, the calculated tangent plane estimates; however, the contraction error metric could alternatively be weighted by the calculated tangent plane estimates calculated for the clusters associated with each representative point in the point-pair without calculating or considering a confidence factors/planarity measure. The advantage of solely taking into account the confidence factors/planarity measure in the calculation of the contraction error metric is that this requires less processing than the use of the tangent plane estimates.

Although the embodiments of the invention described with reference to the drawings comprise computer apparatus and processes performed in computer apparatus, the invention also extends to computer programs, particularly computer programs on or in a carrier, adapted for putting the invention into practice. The program may be in the form of source or object code or in any other form suitable for use in the implementation of the processes according to the invention. The carrier could be any entity or device capable of carrying the program.

For example, the carrier may comprise a storage medium, such as a ROM, for example a CD ROM or a semiconductor ROM, or a magnetic recording medium, for example a floppy disc or hard disk. Further, the carrier may be a transmissible carrier such as an electrical or optical signal which may be conveyed via electrical or optical cable or by radio or other means.

When a program is embodied in a signal which may be conveyed directly by a cable or other device or means, the carrier may be constituted by such cable or other device or means.

Alternatively, the carrier may be an integrated circuit in which the program is embedded, the integrated circuit being adapted for performing, or for use in the performance of, the relevant processes.

The invention claimed is:

1. A computer implemented method for simplification of a point cloud that represents one or more three-dimensional objects or surfaces, the point cloud comprising a set of points, the method comprising:
   receiving the point cloud and storing the point cloud in a memory;
   implementing, with a processor, recursive spatial partitioning of the set of points into a hierarchy of clusters;
   for each cluster, calculating with a processor, a tangent plane estimate for the points in the cluster and deriving a confidence factor for the calculated tangent plane estimate, wherein the confidence factor is a measure of the planarity of the points in the cluster;
   identifying, with a processor, representative points within each cluster in the hierarchy; and,
   for each representative point, defining a point-pair that consists of the representative point and a representative point of an immediate parent cluster; calculating a contraction error metric for each point-pair that is weighted by the inverse of the confidence factors calculated for the clusters associated with each representative point; and
   generating, with a processor, a simplified point cloud that represents the one or more three-dimensional objects or surfaces using a reduced number of points by iteratively contracting the point-pair with the lowest contraction error metric, updating remaining point-pairs as a result of the contraction, and revising the contraction error metric of the updated point-pairs accordingly.

2. The method of claim 1, and further comprising:
   when calculating a contraction error metric for each point-pair, taking into account both the confidence factor derived for the calculated tangent planes for the clusters associated with each representative point and the calculated tangent planes.

3. The method of claim 1, wherein a value of the confidence factor is low if the points in a cluster are randomly distributed throughout a three-dimensional bounding box of the cluster, and the value of the confidence factor is high if all of the points in a cluster lie on or near a planar surface.

4. The method of claim 1, wherein the confidence factor is a non-dimensional scalar measure of the planarity of the points in a cluster.

5. The method of claim 1, wherein the step of deriving a confidence factor for the calculated tangent plane estimate comprises:
   deriving, with a processor, an ellipsoid that fits all of the points in the cluster, including determining eigenvectors for three principle axes of the ellipsoid, and calculating the difference between a longest eigenvector of the ellipsoid and a shortest eigenvector of the ellipsoid as a measure of the planarity of the points in a cluster.

6. The method of claim 1, wherein the step of deriving a confidence factor for the calculated tangent plane estimate comprises:
   deriving, with a processor, an average of the squared distances between each of the points in the cluster and the calculated tangent plane estimate.

7. The method of claim 1, wherein the tangent plane estimate for a cluster is determined by a processor finding a plane that minimizes the squared distances from the plane to all points in the cluster.

8. The method of claim 1, wherein the representative point for a cluster is any of:
   a point selected from the points in the cluster;
   a centroid derived for the points in the cluster; and
   a centroid of a bounding box derived for the points in the cluster.

9. The method of claim 1, wherein the recursive spatial partitioning of the set of points into a hierarchy of clusters comprises implementing, with a processor, divisive hierarchical clustering of the set of points.

10. The method of claim 1, and further comprising:
    generating, with a processor, a logical tree by defining the representative points as nodes of the logical tree, and, for each representative point, defining an edge of the logical tree as a point-pair that consists of the representative point and a representative point of an immediate parent cluster; and
    storing the logical tree in a memory.

11. The method of claim 10, wherein the step of updating remaining point-pairs as a result of the contraction comprises:
    updating, with the processor, the logical tree as a result of the contraction of the point-pair.

12. The method of claim 1, and further comprising:
    defining, with a processor, a contraction queue in which the point-pair with the lowest contraction error metric is first in the contraction queue; and after each contraction, updating the contraction queue to reflect updates in the calculated contraction error metrics of the updated point-pairs; and
    storing the contraction queue in a memory.

13. The method of claim 1, wherein the step of updating remaining point-pairs as a result of the contraction comprises:
    identifying, with a processor, other point-pairs that include either of the points that were included in the contracted point-pair, and updating the identified point-pairs to include a new point generated as a result of the contraction.

14. The method of claim 13, wherein the step of revising the contraction error metric of the updated point-pairs accordingly comprises:
    for each of the point-pairs that are updated to include a new point generated as a result of the contraction, recalculating with a processor the contraction error metric using the new point.

15. The method of claim 1, wherein the contraction of the point-pair with the lowest contraction error metric comprises replacing the point-pair with a new point.

16. The method of claim 15, wherein the step of replacing the point-pair with a new point comprises either of:

selecting, with a processor, a position of one of the points in the point-pair that results in the lowest contraction error metric for the corresponding contraction and generating a new point at the selected position; and determining, with a processor, a position that minimises the contraction error metric for the corresponding contraction and generating a new point at the determined position.

17. The method of claim 1, wherein the contraction error metric is any of a sum of the squared distances between a new point generated as a result of the contraction and each point in an affiliated set of points arising from the contraction of the point-pair and a quadric error metric.

18. A non-transitory computer readable medium storing computer interpretable instructions which when interpreted by a programmable computer cause the computer to perform a method in accordance with claim 1.

19. A computer system for implementing simplification of a point cloud that represents one or more three-dimensional objects or surfaces, the point cloud comprising a set of points, the system comprising:

a memory configured to store the point cloud; and
a processor configured to:

implement recursive spatial partitioning of the set of points into a hierarchy of clusters;

for each cluster, calculate a tangent plane estimate for the points in the cluster and deriving a confidence factor for the calculated tangent plane estimate, wherein the confidence factor is a measure of the planarity of the points in the cluster;

identify representative points within each cluster in the hierarchy and, for each representative point, define a point-pair that consists of the representative point and a representative point of an immediate parent cluster;

calculate a contraction error metric for each point-pair that is weighted by the inverse of the confidence factors calculated for the clusters associated with each representative point; and generate a simplified point cloud that that represents the one or more three-dimensional objects or surfaces using a reduced number of points by iteratively contract the point-pair with the lowest contraction error metric, updating remaining point-pairs as a result of the contraction, and revise the contraction error metric of the updated point-pairs accordingly.

* * * * *